US008221108B2

(12) United States Patent
Higgins

(10) Patent No.: US 8,221,108 B2
(45) Date of Patent: Jul. 17, 2012

(54) PUNCH

(75) Inventor: Trevor Martin Higgins, Nottingham (GB)

(73) Assignee: I Holland Limited, Nottingham (GB)

(*) Notice: Subject to any disclaimer, the term of this patent is extended or adjusted under 35 U.S.C. 154(b) by 0 days.

(21) Appl. No.: 13/144,812

(22) PCT Filed: Jan. 13, 2010

(86) PCT No.: PCT/GB2010/000047

§ 371 (c)(1), (2), (4) Date: Aug. 24, 2011

(87) PCT Pub. No.: WO2010/082022

PCT Pub. Date: Jul. 22, 2010

(65) Prior Publication Data

US 2011/0300253 A1 Dec. 8, 2011

(30) Foreign Application Priority Data

Jan. 16, 2009 (GB) .................................. 0900642.0

(51) Int. Cl.
*B29C 43/08* (2006.01)

(52) U.S. Cl. ....................................... 425/345; 425/352

(58) Field of Classification Search .................... 425/78, 425/344–345, 352–355
See application file for complete search history.

(56) References Cited

U.S. PATENT DOCUMENTS 7,824,170 B2 11/2010 Meissner et al.

FOREIGN PATENT DOCUMENTS

| | | | |
|---|---|---|---|
| DE | 19828004 | A1 | 1/2000 |
| DE | 102007043582 | B3 | 11/2008 |
| EP | 1782944 | A1 | 5/2007 |
| GB | 1137032 | A | 12/1968 |
| JP | 5-84277 | A | 4/1993 |

OTHER PUBLICATIONS

International Search Report and Written Opinion issued May 3, 2010 in corresponding PCT Application PCT/GB2010/000047.

*Primary Examiner* — Richard Crispino
*Assistant Examiner* — Thukhanh Nguyen
(74) *Attorney, Agent, or Firm* — Pearne & Gordon LLP

(57) ABSTRACT

A punch (10, 110) for forming a tablet is described. The punch includes a cam surface (24, 124) which in use contacts a compression surface (62). The cam surface includes a substantially planar flat portion (14, 114), the flat portion having a non-circular shape when viewed along a direction (20) normal to the plane of the flat portion.

15 Claims, 3 Drawing Sheets

PUNCH

The present invention relates to a punch, particularly but not exclusively a punch for forming a tablet or the like.

Typically, apparatus for forming tablets such as pharmaceutical tablets includes at least one punch. The or each punch includes a cam surface which in use contacts a compression surface to apply a compression force via a tablet forming surface to material within a die cavity to form the material into a tablet. However, one problem which is encountered in tablet manufacture is that of the material sticking to the tablet forming surface of the punch. Another problem is that of expelling air from the die cavity.

According to a first aspect of the present invention, there is provided a punch for forming a tablet, the punch including a cam surface which in use contacts a compression surface, the cam surface including a substantially planar flat portion, the flat portion having a non-circular shape when viewed along a direction normal to the plane of the flat portion.

Possibly, the flat portion is elongate, and may have a length along a first axis which is greater than a length along a second axis. Possibly, the second axis is perpendicular to the first axis.

Possibly, the length along the first axis is the maximum dimension of the flat portion. Possibly, the length along the second axis is the minimum dimension of the flat portion.

Possibly, the first axis is aligned substantially along the direction of relative movement of the compression surface and the cam surface.

Possibly the ratio of the length along the first axis to the length along the second axis is greater than 1:1, and may be less than 2:1. Possibly the ratio is approximately 1.5:1.

The flat portion may have a substantially elliptical shape when viewed along the said direction.

Possibly the punch includes a shaft, a relatively enlarged head extending from the shaft, the cam surface being formed on the head.

The shaft may have a longitudinal axis, which may be normal to the plane of the flat portion.

The punch may include a guide formation, which in use may fix the orientation of each punch within each passage, aligning the first axis substantially along a direction of movement of the punch which is normal to the longitudinal axis. The guide formation may be in the form of a projection, which may project laterally from the shaft.

According to a second aspect of the present invention, there is provided apparatus for forming tablets or the like, the apparatus including at least one punch and a compression surface, the punch including a cam surface which in use contacts the compression surface, the cam surface including a substantially planar flat portion, the flat portion having a non-circular shape when viewed along a direction normal to the plane of the flat portion.

Possibly, the punch is as described in any of the preceding paragraphs.

An embodiment of the present invention will now be described by way of example only and with reference to the accompanying drawings, in which:—

FIG. 1 is a schematic side sectional view of apparatus for forming tablets or the like;

Figure 1:
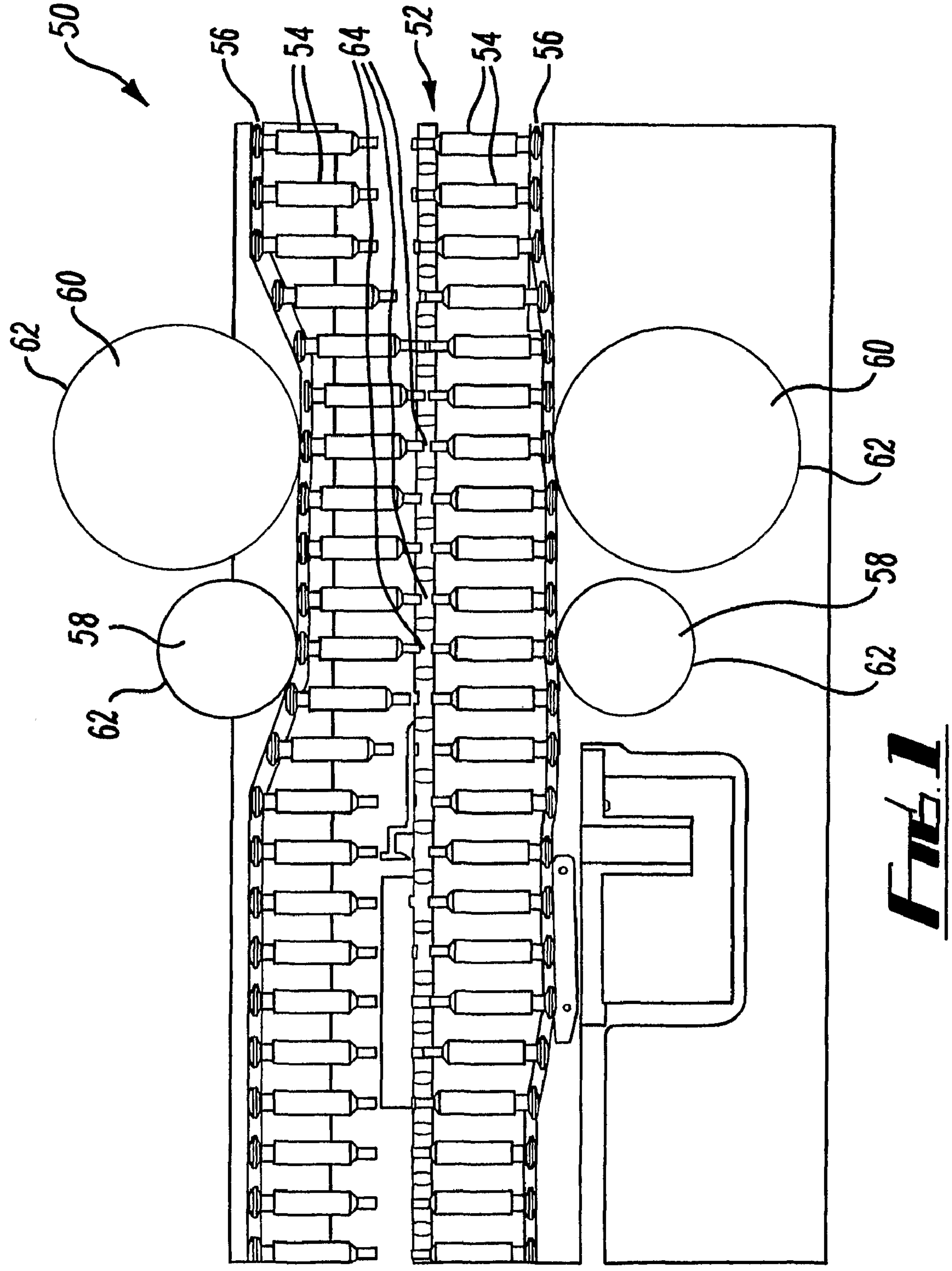
Figure 2:
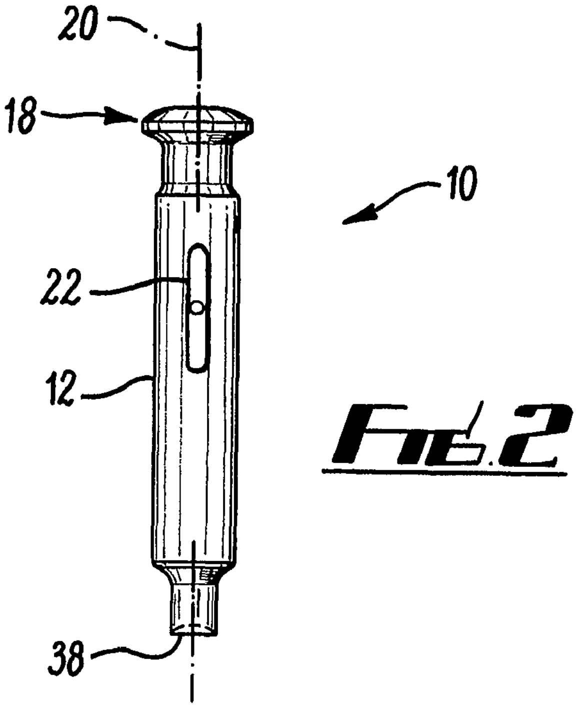
FIG. 2 is a side view of a punch for forming a tablet.

Referring to FIG. 1, apparatus 50 for forming tablets or the like defines a plurality of dies indicated generally in FIG. 1 by the reference numeral 52, a plurality of passages 54 (only a few of which are labelled) extending above and below the dies 52 and two pairs of opposed tracks 56, one pair of tracks 56 located above the upper passages 54 and one pair of tracks 56 located below the lower passages 54.

The apparatus 50 includes a plurality of punches 10, one punch 10 being located in each of the passages 52 and slidably movable along the respective passage 52. The apparatus 50 includes two pairs of compression rollers, each pair comprising a pre-compression roller 58 and a main compression roller 60, one pair being located above the upper pair of tracks 56 and the other pair being located below the lower pair of tracks 56. Each of the compression rollers 58, 60 includes a compression surface 62.

FIGS. 2 to 5 show details of one of the punches 10. The punch 10 includes a shaft 12 which has a longitudinal axis 20. The punch 10 includes a guide formation 22 in the form of a projection which extends laterally outwardly from the shaft 12. The punch 10 includes a relatively enlarged head 18 located at one end of the shaft 12, and at the other end includes a tablet forming surface 38.

Figure 3:
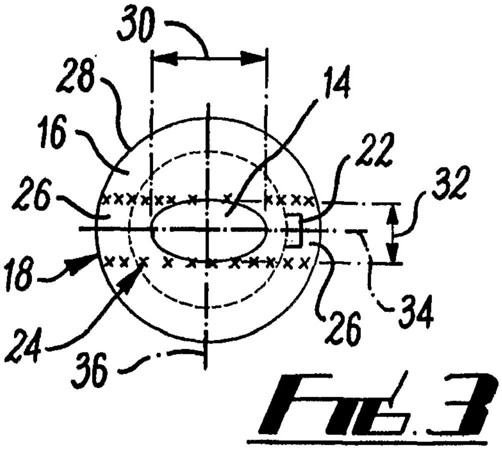
FIG. 3 is a plan view of the punch of FIG. 2.
Figure 5:
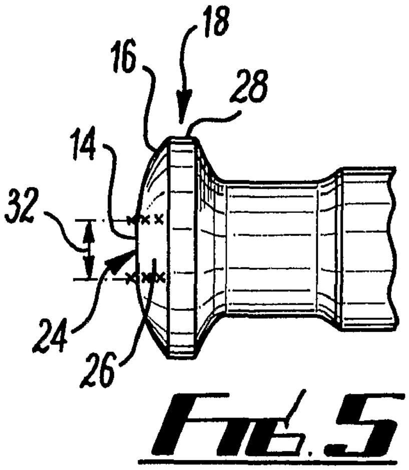
FIG. 5 is a view of a second side of part of the punch.
Figure 4:
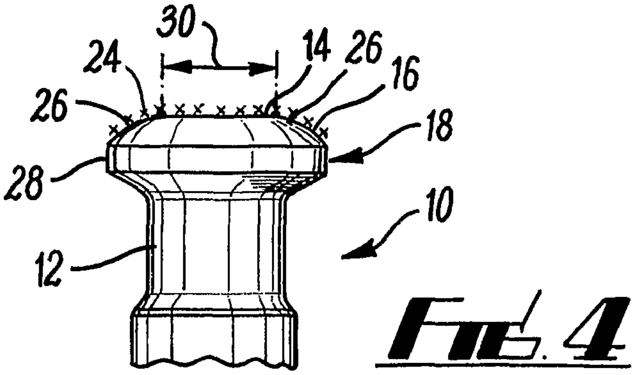
FIG. 4 is a view of a first side of part of the punch.

The head 18 includes a cam surface 24, the approximate boundary of which is indicated in FIGS. 3 and 5 by small crosses. The cam surface 24 includes a substantially planar flat portion 14 and parts 26 of a sloping portion 16. The plane of the flat portion 14 is substantially normal to the longitudinal axis 20. The sloping portion 26 extends from every side of the flat portion 14 to a perimeter 28. In the example shown, the sloping portion 26 has a convexly curved profile, but in other examples, the sloping portion 26 could slope as a constant angle. In plan, when viewed along the longitudinal axis 20, the perimeter 28 is substantially circular.

The flat portion 14 is elongate, being elliptical in shape when viewed along the longitudinal axis 20, having a length 30 along a first axis 34 which is greater than its width 32, the width 32 being the length of the flat portion along a second axis 36, the second axis 36 being perpendicular to the first axis 34. The length 30 forms the maximum dimension of the flat portion 14, and the width 32 forms the minimum dimension of the flat portion 14.

Thus, the flat portion 14 has a non-circular shape when viewed along a direction normal to the plane of the flat portion 14, ie when viewed along the longitudinal axis 20.

In one example, the ratio of the length 30 to the width 32 could be greater than 1:1, and could be less than 2:1. In another example, the said ratio could be approximately 1.5:1.

In use, the punches 10 are arranged in the apparatus 50 so that opposed parts of the perimeters 28 of the heads 18 of the punches 10 locate in the opposed tracks 56. The guide projection 22 of each punch 10 locates within a corresponding formation (not shown in the drawings) of the passages 54.

The punches 10 move along the tracks 56, the movement of the punches 10 within the passages 54 being determined by the tracks 56. As the punches 10 proceed along the tracks 56, the compression surfaces 62 of the compression rollers 58, 60 (not shown) contact the cam surfaces 24 of the punches 10, urging the punches 10 into the dies 52 to apply a compressive force to material 64 therein.

The length 30 of the flat portion 14 of the cam surface 24 determines the length of time during which each punch 10 applies a maximum compressive force to the material 64. This length of time is referred to as the “dwell time”. It has been found that extending the dwell time reduces the amount of material 64 which adheres to the tablet forming surface 38 when the punch moves out of the die 52. Extending the dwell time also improves the expulsion of air from the die cavity, which in turn reduces the incidence of "capping" in which a "cap" of compressed material separates from the formed tablet. The longer dwell time also permits a longer time for the physical and chemical reactions associated with the tablet compression process to take place. The use of a non-circular flat portion 14 provides a longer dwell time, reducing the amount of adhering material, while permitting the punch 10 to be of a standard size and shape in terms of its shaft and head perimeter, permitting use in conventional or standard tablet forming apparatus.

Figure 6:
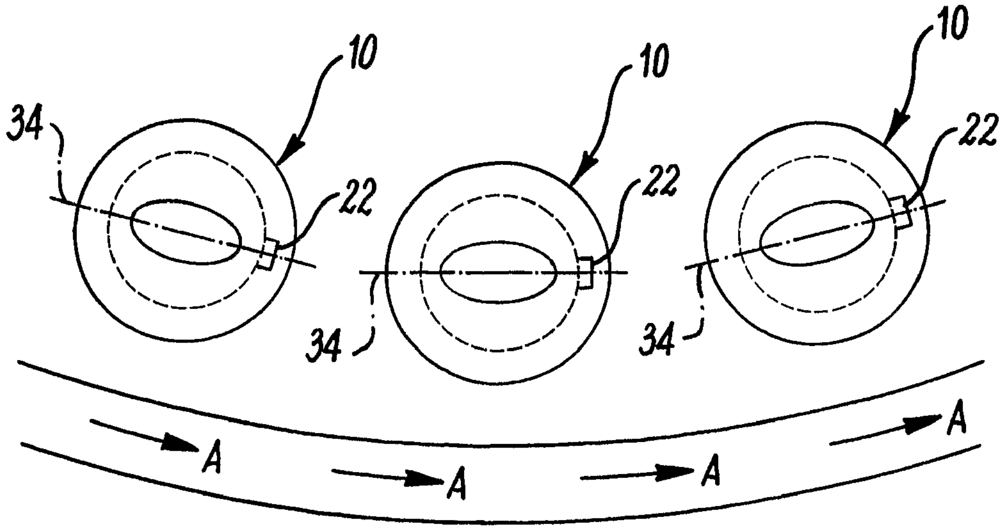
FIG. 6 is a simplified schematic plan view of a part of the apparatus of FIG. 1.

As shown in FIG. 6, the location of the guide projections 22 of each punch 10 within the corresponding formations of the passages 54 fixes the orientation of each punch 10 within each passage 54, and aligns the first axis 34 substantially along a direction of movement of the punch 10 which is normal to the longitudinal axis 20. This ensures that the maximum dimension of the flat portion 14 contacts the compression surfaces 62.

Figure 7:
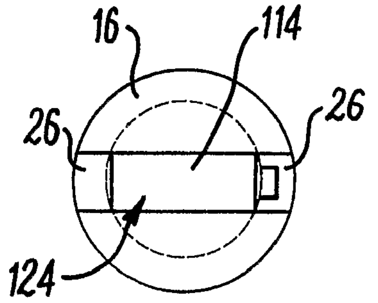
FIG. 7 is a plan view of a second punch.
Figure 9:
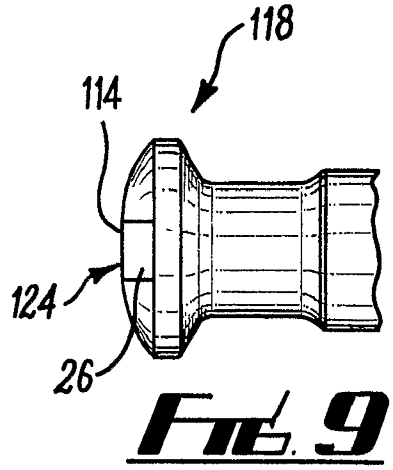
FIG. 9 is a view of a second side of part of the second punch
Figure 8:
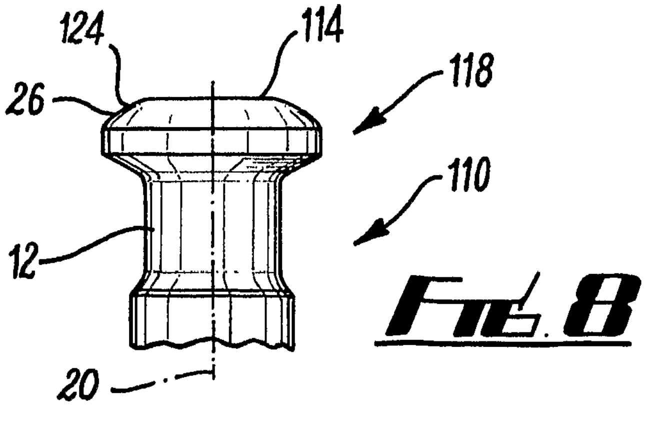
FIG. 8 is a view of a first side of part of the second punch.

FIGS. 7-9 show a second embodiment of the invention, many features of which are similar to those described above. Where features are the same or similar, the same reference numerals have been used, and these features will not be described in detail again for the sake of brevity.

FIGS. 7 to 9 show a punch 110 including a head 118, which includes a cam surface 124 including a substantially planar flat portion 114 and parts 26 of a sloping portion 16. In this embodiment, the flat portion 114 is substantially rectangular in shape when viewed along the longitudinal axis 20.

Various other modifications could be made without departing from the scope of the invention. For instance, the flat portion could be of any non-circular shape and size. For example, in shape, the flat portion could be rectangular, or oval. The punch could be of any suitable size and shape, and made of any suitable material. In one example the punch is formed of a hardenable material such as metal. The guide formation could be of any suitable size and shape. In one example, the guide formation could comprise a recess defined by the shaft.

The punch could be used for any suitable purpose or application, and could be used to form any suitable size, type or shape of tablet.

The tablet forming apparatus could be of any suitable size, shape and arrangement. For example, the tablet forming apparatus could comprise any suitable number of punches, and could include only one punch.

The material to be formed by the punch could be any suitable material.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A punch for forming a tablet in a rotary tablet press, the punch including a shaft, a relatively enlarged head extending from the shaft, a cam surface being formed on the head, the cam surface which in use contacts a compression surface, the cam surface including a substantially planar flat portion, the flat portion having a non-circular shape when viewed along a direction normal to the plane of the flat portion, the flat portion being elongate, and having a length along a first axis which is greater than a length along a second axis, the first axis being aligned substantially along the a direction of relative movement of the compression surface and the cam surface.

2. A punch according to claim 1, in which the second axis is perpendicular to the first axis.

3. A punch according to claim 1, in which the length along the first axis is the maximum dimension of the flat portion.

4. A punch according to claim 1, in which the length along the second axis is the minimum dimension of the flat portion.

5. A punch according to claim 1, in which the ratio of the length along the first axis to the length along the second axis is greater than 1:1.

6. A punch according to claim 1, in which the ratio of the length along the first axis to the length along the second axis is less than 2:1.

7. A punch according to claim 6, in which the ratio of the length along the first axis to the length along the second axis is approximately 1.5:1.

8. A punch according to claim 1, in which the flat portion has a substantially elliptical shape when viewed along the said direction normal to the plane of the flat portion.

9. A punch according to claim 1, in which the shaft has a longitudinal axis.

10. A punch according to claim 9, in which the longitudinal axis is normal to the plane of the flat portion.

11. A punch according to claim 9, in which the punch includes a guide formation, which in use fixes the orientation of each punch within a passage defined by apparatus for forming tablets, aligning the first axis substantially along a direction of movement of the punch which is normal to the longitudinal axis.

12. A punch according to claim 11, in which the guide formation is in the form of a projection.

13. A punch according to claim 12, in which the projection projects laterally from the shaft.

14. A rotary tablet press comprising a punch and a compression surface, the punch including a shaft, a relatively enlarged head extending from the shaft, a cam surface being formed on the head, the cam surface in use contacting the compression surface, the cam surface including a substantially planar flat portion, the flat portion having a non-circular shape when viewed along a direction normal to the plane of the flat portion, characterized in that the flat portion is elongate, and has a length along a first axis which is greater than a length along a second axis, the first axis being aligned substantially along a direction of relative movement of the compression surface and the cam surface.

15. A punch according to claim 2, in which the length along the first axis is the maximum dimension of the flat portion.

* * * * *